Nov. 19, 1940.  J. W. PRATT ET AL  2,221,880
COATING WITH THERMOPLASTICS
Filed Nov. 21, 1938  2 Sheets-Sheet 1
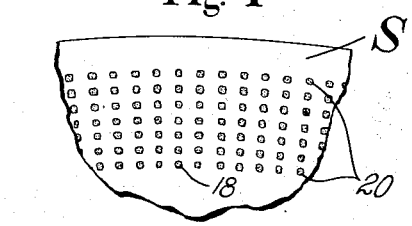
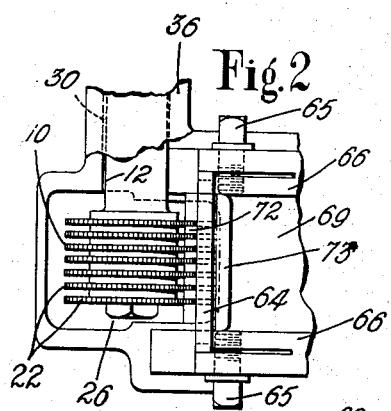
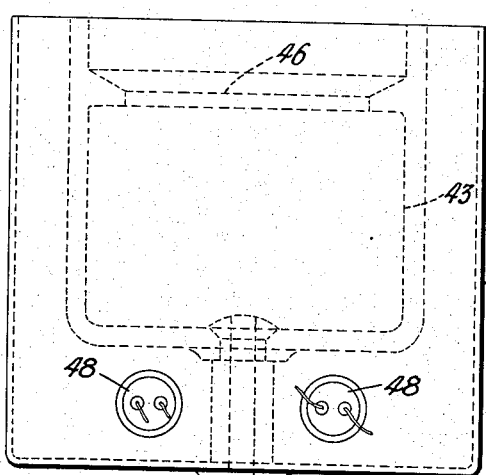
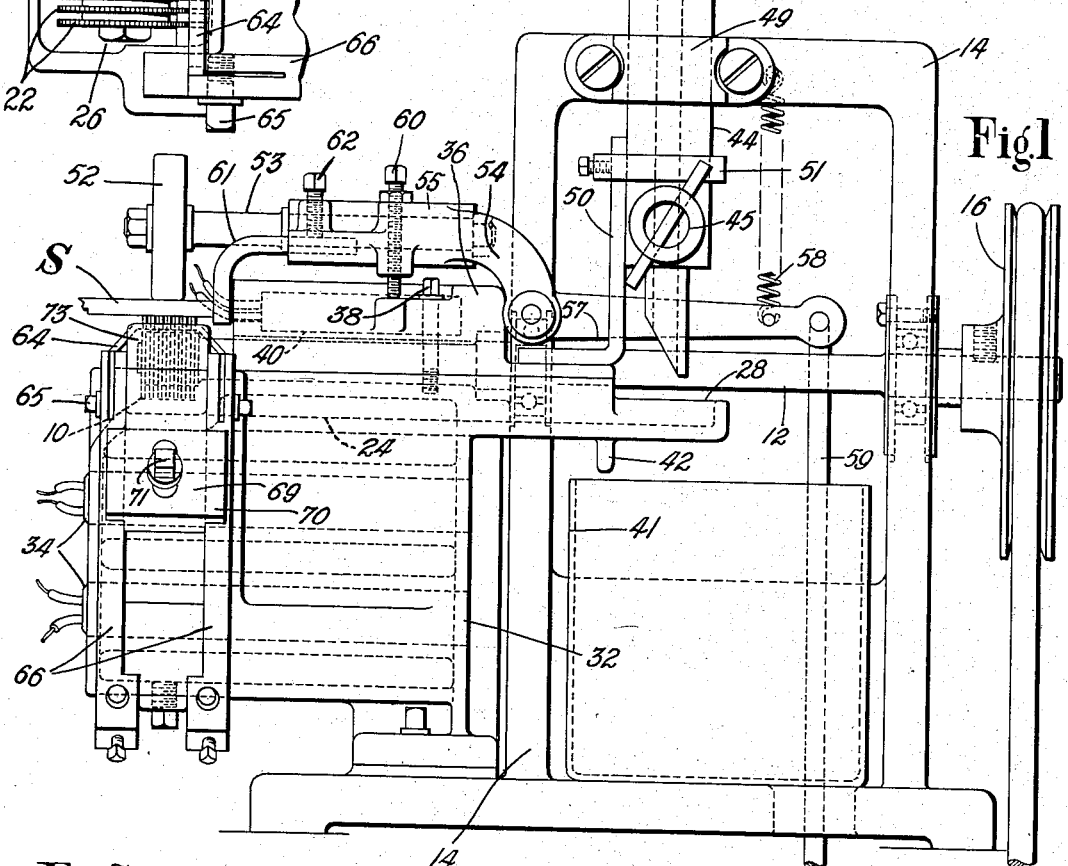
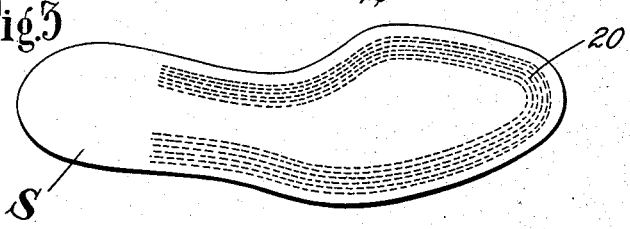

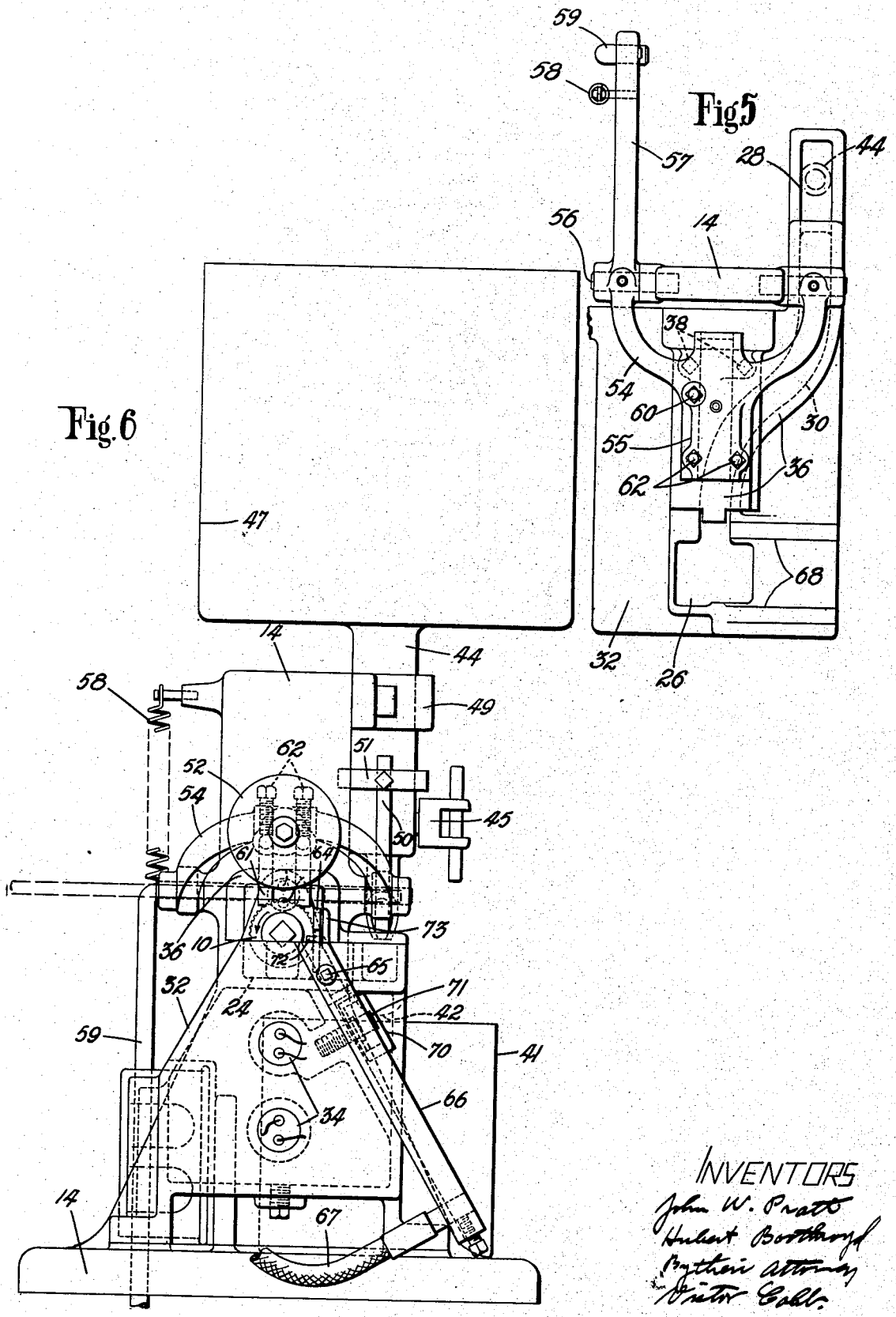

Patented Nov. 19, 1940

2,221,880

UNITED STATES PATENT OFFICE 2,221,880

COATING WITH THERMOPLASTICS

John William Pratt and Hubert Boothroyd, Leicester, England, assignors to United Shoe Machinery Corporation, Borough of Flemington, N. J., a corporation of New Jersey Application November 21, 1938, Serial No. 241,623
In Great Britain June 30, 1938

8 Claims. (Cl. 91—51)

This invention relates to machines for applying thermoplastic material and is herein illustrated as embodied in a machine for applying a marginal band of thermoplastic cement on a shoe sole.

The application of thermoplastic materials is attended with difficulties arising from the necessity of maintaining the material at a temperature sufficient to keep it fluid, from the viscous nature of the material, from the readiness with which the material again hardens after the source of heat which keeps it fluid has been removed and from the tendency of the work under some conditions to chill the material as it is applied thereto, with the resulting tendency to a poor bond between the two.

An object of the invention is to provide an improved coating-applying machine particularly adapted for the application of thermoplastic materials, by which the above-mentioned difficulties may be avoided.

To this end and in accordance with a feature of the invention, provision is made for supplying the material to the applying member from an open trough, in an end portion of which a rotary applying member dips. A convenient arrangement for maintaining this trough at the desired temperature is provided by a supporting base which is hollow and, as illustrated, is kept filled with a liquid heated electrically to the desired temperature.

The illustrated machine provides for supplying the trough with additional material from an overhead receptacle from which the material is delivered drop by drop to the trough at a point remote from the applying member. Most of the intermediate portion of the trough is enclosed by a cover which itself is heated, as by an electric unit.

The piece of work to which the thermoplastic is applied will ordinarily be at a much lower temperature than the fluid material and, as a consequence, the applied material will solidify promptly after it has been applied to the work. If, however, the difference in temperature is too great, there is a possibility that the thermoplastic will not be well bonded with the work and, for this and other reasons, it has been found desirable, in accordance with another feature of the invention, to apply heat to the work just prior to its contact with the applying member. A novel arrangement for carrying this out provides means positioned just to the rear of the applying member, considered with respect to the direction of movement of the work, and by which the work is heated before it comes into contact with the applying member. As illustrated, this heating device is a transverse bar, the ends of which are secured to electric conductors joined to a low-voltage source of electricity. The bar, heated by the passage of the current, is positioned to underlie the work and neither the operator's hands nor the approaching work can contact with the bar because of a guard plate positioned to the rear of the bar. Conveniently, this guard plate is made integral with a scraper designed to coact with the upgoing side of the rotary applying member.

These and other features of the invention will be best understood from a consideration of the following specification, taken in connection with the accompanying drawings, in which Fig. 1 is a side elevation of the machine as a whole;

Fig. 2 is a plan view of the applying roll and the associated electrically heated bar;

Fig. 3 is a plan of a sole to which a band of coating material has been applied marginally thereof;

Fig. 4 illustrates the application of the material in a series of dots;

Fig. 5 is a plan view, with parts removed, of the trough, the cover therefor and a carrier for a presser roll, and Fig. 6 is an end elevation of the machine.

In the illustrated machine, an applying roll 10 is attached to the outer end of a shaft 12 which is rotatably supported in bearings in a frame 14 and capable of being driven counterclockwise, as indicated by the arrow in Fig. 6, by power supplied to a driving pulley 16. The applying roll is made up of a series of toothed disks, the spaced projections of which are arranged to slightly penetrate a sole S and to apply a series of dots or blobs 18 (Fig. 4) to the sole. As indicated in Fig. 3, this series of dots will constitute a band 20 which is supplied to the margin of the sole S in an area slightly spaced from the outer edge thereof. Preferably and in order to facilitate turning of the sole at sharply curved portions, only the two outer disks 22 are fixed to the shaft while the remaining disks are frictionally retained thereon so that they may turn independently of the shaft when it is necessary.

This driven applying roll 10 is positioned to pick up cement from a trough 24 which comprises a rectangular recess 26 beneath the applying member, a tray 28 at a point remote therefrom and an intermediate connecting channel portion 30 (Fig. 5). To heat the trough and maintain the material therein in a fluid condition, it is preferably formed as a casting integral with a hollow prismoidal base 32 designed to be filled with oil and kept at the proper temperature by a pair of electric heating units 34 received in sleeves extending inwardly from one side of the base. Removal of a heating unit for replacement will, therefore, not require the oil to be drained from the base. The prismoidal base 32 is narrow adjacent to the trough and has front and rear sides sloping outwardly and downwardly therefrom to provide space for curved pieces of work so that there will be no interference between the machine and portions of the work, even in the case of soles which have been molded prior to their presentation to the machine. The intermediate channel portion 30 of the trough is provided with a cover 36 held in position by screws 38 and itself provided with an electric cartridge heating unit 40. This not only keeps the material from being chilled in its passage from the tray 28 to the recess 26 but also greatly facilitates the remelting of the material when, after an interval, the machine has to be started up anew. The material is kept at a low predetermined level in the trough by providing for the overflow therefrom into a receptacle 41 positioned on the base and any tendency for the material to run too far back under the trough is overcome by a depending lip 42 which itself is above the receptacle 41. Attention is also called to the fact that the shaft 12 carrying the applying roll 10 is, for a portion of its length, received in a recess in the cover 36, thus insuring that the forward portion of the shaft and the disks thereon will be quickly heated to a temperature sufficient to insure proper handling of the material by the disks.

Melted material is supplied through the trough 24 at a constant rate, sufficient to make up the average consumption of material by application to the work, by causing it to fall, drop by drop, into the tray portion 28 of the trough. To this end, the machine is provided with a receptable 43 having a depending tube 44 in which there is positioned a hand valve 45 for controlling the rate of delivery of the material. The receptacle 43, which has a flange 46 for the support of an inverted can of material, is surrounded by an oil-filled jacket 47 to which heat is supplied by electric units 48. The receptacle is supported on the frame 14 by a clamp 49 surrounding the depending delivery tube 44. In order to assist in maintaining this delivery tube at the proper temperature and prevent chilling thereof by air currents, heat is transferred from the cover 36 by a metallic bar 50 secured to the cover and held in contact with the tube 44 by a surrounding clamp band 51.

A piece of work such as the sole S is held in contact with the upper surface of the applying roll 10 by a presser roll 52 which is freely rotatable on a shaft 53 which is clamped in a midportion 55 of a U-shaped carrier 54, swingably mounted on the frame 14 by pivot pins 56 (Fig. 5). Forming part of this carrier is an inwardly extending arm 57 which is normally held upwardly by a spring 58 thereby to hold the presser roll 52 in contact with the work but which may be depressed to lift the presser roll for the insertion of the work by a treadle (not shown) attached to a treadle rod 59. The limit of downward movement of the presser-roll carrier is determined by an adjustable stop screw 60 contacting with a portion of the cover 36. This position will always be such that the presser roll 52 cannot contact with the applying roll 10 when no work is in position in the machine. The position of the marginal band 20 with respect to the edge of the sole is determined by gage rods 61 having depending ends to contact with the edge of the work and horizontal portions which are clamped in the presser-roll carrier 54 by set screws 62. The depending ends of the gage rods 61 are in planes equally spaced forwardly and rearwardly of the axis of the applying roll, thus facilitating the even positioning of the marginal band 20 with respect to the edge of the sole and they may be moved in and out with respect to the carrier 54 to determine the spacing of the band from the edge of the sole.

A heated crossbar 64, the general shape of which is that of an inverted U, is positioned with its midportion just to the rear of the applying roll 10 and slightly below the level of the upper surface thereof, thus heating successive small areas of the margin only on the the under or attaching face of the work just before it comes in contact with the disks of the applying roll. The legs of this inverted U-shaped crossbar 64 are held by clamp screws 65 in the split ends of heavy conductor bars 66 to which low-voltage electricity is supplied by leads 67 (Fig. 6). These heavy bars 66 are substantially rectangular in cross section and are received in grooves 68 (Fig. 5) in the inclined face of the prismoidal base 32, the bars preferably being coated with lacquer to insulate them from this base. The conductors 66 are held in position on the side of the base 32 by a clamp plate 69 having overhanging flanges 70 and clamped in adjusted position by a screw 71. The upper portion of this clamp plate 69 controls the quantity of material on the periphery of the toothed roll and is provided with teeth 72 entering the spaces between the disks to prevent the material from bridging these spaces. The plate 69 also has an upstanding guard plate 73 which lies just to the rear of the heated crossbar 64 and is at such a height that the approaching work cannot actually contact with the crossbar 64. Obviously, the guard 73 also prevents the operator from getting his fingers against the heated crossbar.

In the use of the machine, electric current will be supplied to the heating units 34, 40 and 48 and from a low-voltage source of supply to the electric leads 67 so that the material in the receptacle and in the trough 24 will quickly be brought to a fluid condition to enable its proper application to the work and to render possible an easy rotation of the applying roll 10. Only a small quantity of material is contained in this trough 24 and there is no opportunity for the material to enter the bearings for the shaft 12 on which the applying roll 10 is carried. During average operating conditions, it will be easy to adjust the control valve 45 so that only so much of the material contained in the receptacle 43 will enter the trough as is used up by the applying roll. If, however, the rate of flow is not exact, no harm is done since the material will flow over the lower sides of the tray portion 28 and be received in the overflow receptacle 41, part of the material dripping from the lip 42. As each successive portion of the work approaches the applying roll, it will ride over the guard 73 and be warmed by the heated crossbar 64 so that there will be no undue chilling of the material on the applying roll. Obviously, too, the heat radiated from the crossbar 64 will aid in keeping the applying roll 10 at the desired temperature.

Having described our invention, what we claim as new and desire to secure by Letters Patent of the United States is:

1. In a machine for applying thermoplastic material, a trough, a frame supporting the trough, an applying member having a shaft journaled in said frame and positioned to dip in the trough, and a heated cover overlying a midportion of the trough and a portion of said shaft.

2. In a machine for applying thermoplastic material, a trough, means for heating the trough, an applying member journaled above the trough and dipping therein, a heated receptacle having a delivery pipe arranged to supply material to a remote part of the trough, a heated cover overlying the trough between the point of delivery and the point of removal, and means for transferring heat from said cover to said delivery pipe.

3. In a machine for applying thermoplastic cement, an applying member adapted to contact with the work, a heated crossbar positioned just to the rear of said applying member, and a guard positioned to the rear of the crossbar preventing contact of the work with said crossbar.

4. In a machine for applying thermoplastic cement, a rotatable applying member, a trough in which said applying member dips, means for heating said trough, a crossbar positioned to the rear of the applying member, with respect to the direction of movement of the work, means for maintaining the work out of direct engagement with the crossbar while permitting the crossbar to apply heat by radiation to the work, and means for heating said crossbar.

5. In a machine for applying thermoplastic cement, an applying member, a crossbar of electrically conductive material positioned to the rear of the applying member for progressively heating the work as it moves to the applying member, means for preventing direct contact of the work with said crossbar, and leads for supplying electric current of low voltage to the ends of said crossbar.

6. In a machine for applying thermoplastic material, a trough, an applying member dipping in said trough, a receptacle for liquid underlying the trough, means for heating said receptacle, massive bars clamped to but insulated from said receptacle, and a crossbar bridging said bars and adapted to be heated by the passage of electric current therethrough, said crossbar being positioned to the rear of the applying member thereby to warm the work as it approaches the applying member.

7. In a machine for applying thermoplastic material, a rotatable applying member, a trough for supplying material to the under side of said member, a scraper associated with the upgoing side of said applying member, a heated bar positioned adjacent to the upgoing side of said member above the scraper and extending transversely of the periphery of the applying member, and an upstanding guard on said scraper positioned to the rear of the heated bar to protect the operator and to prevent contact of the work with the bar as it traverses the exposed surface of the applying member.

8. In a machine for applying thermoplastic cement to shoe soles, means for heating the cement, means for progressively heating successive small areas of the margin of one surface of a sole by radiation, means for applying the hot cement progressively to the heated areas of the margin on this same surface before an area has had a chance to cool, and means cooperating with said means for effecting the progressive feed of a sole.

JOHN WILLIAM PRATT.
HUBERT BOOTHROYD.